US012262331B2

(12) United States Patent
Fakoorian et al.

(10) Patent No.: US 12,262,331 B2
(45) Date of Patent: Mar. 25, 2025

(54) POWER VALUE REPORT FOR INTEGRATED ACCESS AND BACKHAUL

(71) Applicant: Apple Inc., Cupertino, CA (US)

(72) Inventors: Seyed Ali Akbar Fakoorian, San Diego, CA (US); Yushu Zhang, Beijing (CN); Chunxuan Ye, San Diego, CA (US); Dawei Zhang, Saratoga, CA (US); Haitong Sun, Saratoga, CA (US); Hong He, San Jose, CA (US); Huaning Niu, San Jose, CA (US); Jie Cui, San Jose, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,584

(22) PCT Filed: Mar. 31, 2021

(86) PCT No.: PCT/CN2021/084660
§ 371 (c)(1),
(2) Date: Sep. 23, 2021

(87) PCT Pub. No.: WO2022/205162
PCT Pub. Date: Oct. 6, 2022

(65) Prior Publication Data
US 2023/0239810 A1    Jul. 27, 2023

(51) Int. Cl.
*H04B 7/00*    (2006.01)
*H04W 52/36*    (2009.01)

(52) U.S. Cl.
CPC ....... *H04W 52/365* (2013.01); *H04W 52/367* (2013.01)

(58) Field of Classification Search
CPC . H04W 52/365; H04W 52/367; H04W 40/36; H04W 36/305; H04W 74/002; H04W 74/004; H04W 74/006
See application file for complete search history.

(56) References Cited

U.S. PATENT DOCUMENTS 11,706,770 B2 *   7/2023   Yang .................... H04W 52/365
11,729,697 B2 *   8/2023   Kumar .................. H04W 74/02
                                                             370/329
2016/0330698 A1  11/2016  Loehr et al.
(Continued)

FOREIGN PATENT DOCUMENTS

WO    2020114030    6/2020
WO    2020169206    8/2020
(Continued)

OTHER PUBLICATIONS

Enhancements for simultaneous operation of MT and DU, Huawei, 3GPP TSG RAN WG1 Meeting #103-e, RI-2007595, Nov. 13, 2020, 9 pages.
(Continued)

*Primary Examiner* — Tuan Pham
(74) *Attorney, Agent, or Firm* — Kilpatrick Townsend & Stockton LLP

(57) ABSTRACT

The present application relates to devices and components including apparatus, systems, and methods for power headroom reporting in integrated access and backhaul nodes.

20 Claims, 7 Drawing Sheets

(56) References Cited

U.S. PATENT DOCUMENTS

2021/0045070 A1    2/2021  Yi et al.
2023/0180147 A1*   6/2023  Kowalski .............. H04W 52/46
                                                         455/522

FOREIGN PATENT DOCUMENTS

WO      2021020350        2/2021
WO      2022044265 A1     3/2022

OTHER PUBLICATIONS

International Patent Application No. PCT/CN2021/084660, International Search Report and the Written Opinion, Mailed on Dec. 29, 2021, 9 pages.
Summary #3 of [104-e-NR-eIAB-02], Qualcomm Inc., 3GPP TSG RAN WG1 Meeting #104e, R1-2102031, Jan. 25-Feb. 5, 2021, 54 pages.
3rd Generation Partnership Project; Technical Specification Group Radio Access Network; NR; Requirements for support of radio resource management (Release 17), 3GPP TS 38.133 V17.0.0, Dec. 2020, 2400 pages.
3rd Generation Partnership Project; Technical Specification Group Radio Access Network; NR; Physical layer procedures for control (Release 16), 3GPP TS 38.213 V16.5.0, Mar. 2021, 183 pages.
3rd Generation Partnership Project; Technical Specification Group Radio Access Network; NR; Medium Access Control (MAC) protocol specification (Release 16), 3GPP TS 38.321 V16.4.0, Mar. 2021, 157 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
International Patent Application No. PCT/CN2021/084660, International Preliminary Report on Patentability, Oct. 12, 2023, 6 pages.
Other enhancements for simultaneous operation of IAB-node's child and parent links, 3 Generation Partnership Project Technical Specification Group Radio Access Network Working Group1 #104-e R1-2101629, Jan. 25-Feb. 5, 2021, 7 pages.
Japan Patent Application No. 2023-556568, Office Action, Jul. 29, 2024, 9 pages.
3rd Generation Partnership Project; Technical Specification Group Radio Access Network; NG-RAN; F1 application protocol (F1AP) (Release 16), 3GPP TS 38.473 V16.4.0, Jan. 2021, 461 pages.
On Enhancements For Simultaneous Operation of Iab-node's Child and Parent Links, Qualcomm Incorporated 3 Generation Partnership Project Technical Specification Group-Radio Access Network Working Group1 Meeting #103-e, R1-2009270, Oct. 26-Nov. 13, 2020, 12 pages.
European Patent Application No. 21933827.4, Extended European Search Report, Mailed on Nov. 20, 2024, 9 pages.

* cited by examiner

300

| | C₇ | C₆ | C₅ | C₄ | C₃ | C₂ | C₁ | R |
|---|---|---|---|---|---|---|---|---|
| 304 | P | V | \multicolumn{6}{c} PH (Type 1, PCell – DM1) |
| 304 | R | R | \multicolumn{6}{c} $P_{CMAX,f,c}$ 1 |
| 308 | P | V | \multicolumn{6}{c} PH (Type 3, PCell – DM1) |
| 308 | R | R | \multicolumn{6}{c} $P_{CMAX,f,c}$ 2 |
| 312 | P | V | \multicolumn{6}{c} PH (Type 1, PCell – DM2) |
| 312 | R | R | \multicolumn{6}{c} $P_{CMAX,f,c}$ 3 |
| 316 | P | V | \multicolumn{6}{c} PH (Type 3, PCell – DM2) |
| 316 | R | R | \multicolumn{6}{c} $P_{CMAX,f,c}$ 4 |
| 320 | P | V | \multicolumn{6}{c} PH (Type 1, PCell – DM3) |
| 320 | R | R | \multicolumn{6}{c} $P_{CMAX,f,c}$ 3 |
| 324 | P | V | \multicolumn{6}{c} PH (Type 3, PCell – DM3) |
| 324 | R | R | \multicolumn{6}{c} $P_{CMAX,f,c}$ 4 |

Figure 3

POWER VALUE REPORT FOR INTEGRATED ACCESS AND BACKHAUL

CROSS-REFERENCE TO RELATED APPLICATIONS

This application is a U.S. National Phase of PCT/CN2021/084660 filed Mar. 31, 2021, the disclosure of which is herein incorporated by reference in its entirety for all purposes.

BACKGROUND

Integrated access and backhaul (IAB) is a network technology in Third Generation Partnership Project (3GPP) to facilitate relaying of access traffic by sharing radio resources between access and backhaul links. In an IAB deployment, an IAB donor is a radio access network (RAN) node that provides an interface to a core network and provides wireless backhauling functionality to an IAB node. An IAB node is a RAN node that provides a UE with wireless access and wirelessly backhauls the access traffic to another IAB node or an IAB donor. In this manner, last mile connectivity may be improved when having a fiber backhaul to all access nodes is impractical.

BRIEF DESCRIPTION OF THE DRAWINGS

FIG. 3 includes another packet headroom report in accordance with some embodiments.

DETAILED DESCRIPTION

Figure 1:
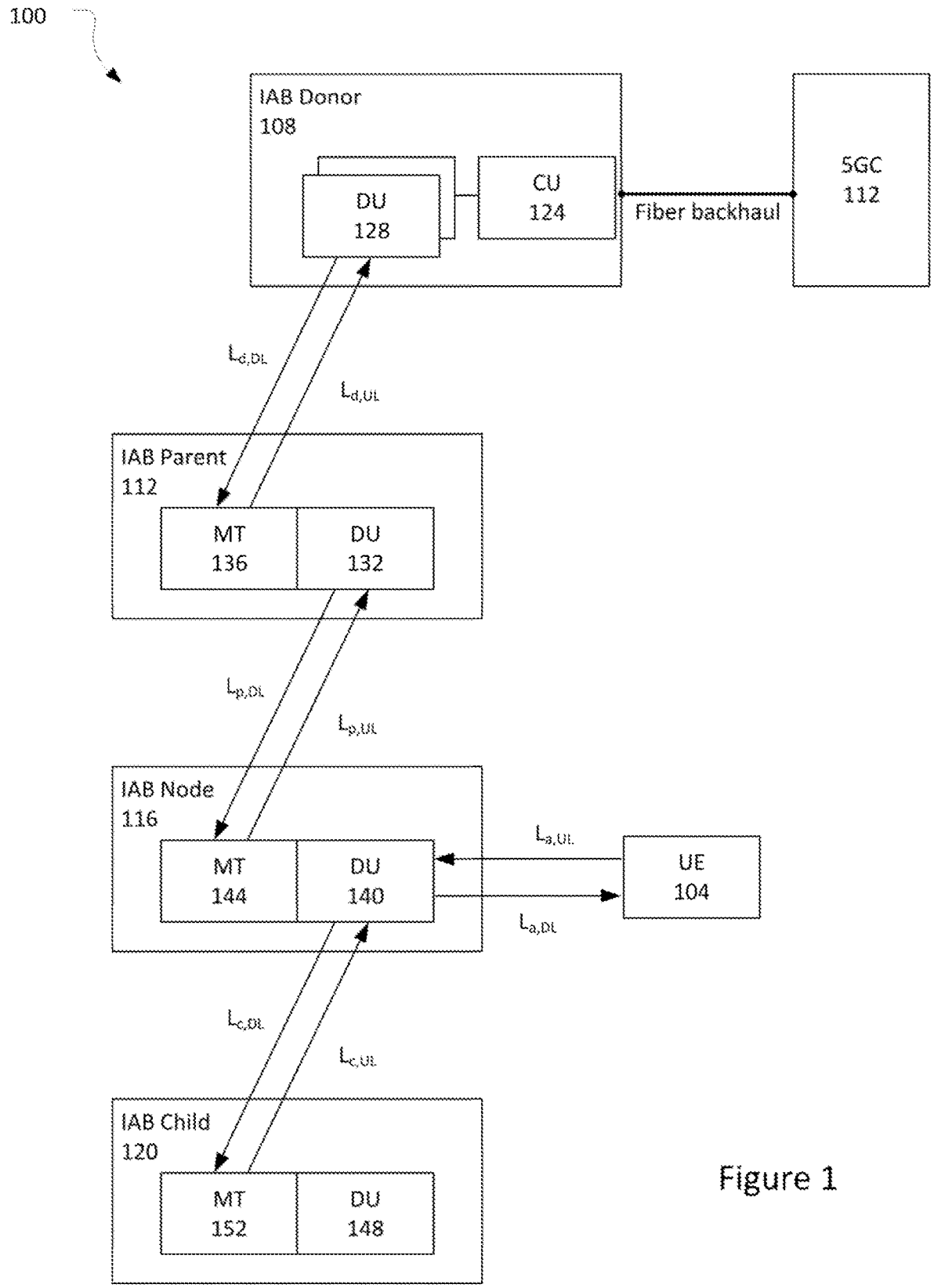
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a number of IAB nodes that provide network access to one or more UEs, for example, UE 104. In particular, the network environment 100 may include an IAB donor 108 coupled with a 3GPP Fifth Generation Core Network (5GC) that offers various data and telecommunications services to customers/subscribers.

The IAB donor 108 may be coupled with the 5GC 112 by a fiber backhaul connection. The fiber backhaul connection may facilitate communication of network traffic at higher speeds associated with 3GPP New Radio (NR) access links.

The IAB donor 108 may provide a wireless backhaul to one or more IAB nodes including, for example, IAB parent 112, IAB node 116, and IAB child 120. The IAB nodes may be coupled directly with the IAB donor 108 (such as that shown with respect to IAB parent 112) or may be indirectly coupled with the IAB donor 108 through one or more intermediate IAB nodes. For example, IAB node 116 may be coupled with IAB donor 108 through IAB parent 112, and IAB child 120 may be coupled with the IAB donor 108 through IAB node 116 and IAB parent 112.

The "parent" and "child" descriptors of IAB parent 112 and IAB child 120 are described with respect to IAB node 116. That is, the IAB parent 112 may be a parent IAB node with respect to IAB node 116, and the IAB child 120 may be a child IAB node with respect to IAB node 116.

The IAB donor 108 may include a centralized unit (CU) 124 and one or more distributed units (DUs), for example, DU 128. In general, the CU 124 may handle higher-layer protocols, for example, radio resource control (RRC), packet data convergence (PDCP), and service data adaptation protocol (SDAP) layer protocols, while the DUs handle lower-layer protocols, for example, radio link control (RLC), media access control (MAC), and physical (PHY) layer protocols.

Each of the IAB nodes 112, 116, and 120 may include a DU and a mobile termination (MT). In particular, IAB parent 112 may include DU 132 and MT 136; IAB node 116 may include DU 140 and MT 144; and IAB child 120 may include DU 148 and MT 152.

The MTs may be used to connect an IAB node with an upstream (for example, towards the 5GC 108) RAN node (for example, IAB-node or IAB donor). In general, the MTs may provide the IAB nodes with access functionality similar to a UE. For example, the MT may utilize protocols that a typical UE may use to connect to a RAN. The MTs may, for example, allow an IAB node to establish signaling radio bearers (SRBs) and/or data radio bearers (DRBs) with a parent node. An MT may perform cell selection to identify an upstream RAN node to join and then set up and utilize an RLC channel through a backhaul adaptation (BAP) layer that provides functionality for routing data for different UE bearers over different routes through the network. The MT may also perform, for example, cell reselection, radio-link failure, etc.

The DUs may be used to connect an IAB node with a downstream IAB node or a UE. The DUs may establish an RLC channel, which may be referred to as a modified RLC channel, to the UEs or the MTs of the downstream IAB node.

The DU 128 may be coupled with the MT 136 by a downlink donor link ($L_{d,DL}$) and an uplink donor link ($L_{d,UL}$). The DU 132 may be coupled with the MT 144 by a downlink parent link ($L_{p,DL}$) and an uplink parent link ($L_{p,UL}$). The DU 140 may be coupled with the MT 152 by a downlink child link ($L_{c,DL}$) and an uplink child link ($L_{c,UL}$). The DU 140 may also be coupled with the UE 104 by a downlink access link ($L_{a,DL}$) and an uplink access link ($L_{a,UL}$).

To multiplex resources between child and parent links, an IAB node may operate in one of a number of duplex modes. In a first duplex mode, which may be referred to as a time division multiplex (TDM) mode, an MT of an IAB node may not transmit on an uplink when the DU of the IAB node is transmitting on a downlink or receiving on an uplink. In a second duplex mode, which may be referred to as a simultaneous mode, the MT of an IAB node may transmit on an uplink or receive on a downlink when the DU of the IAB node is either transmitting on the downlink or receiving on the uplink. The simultaneous mode may include the MT transmitting while the DU is transmitting; the MT transmitting while the DU is receiving; the MT receiving while the DU is transmitting; and the MT receiving while the DU is receiving. The two simultaneous modes in which the MT is transmitting may be referred to herein as simultaneous transmit modes. For example, the simultaneous transmit modes may include the MT transmitting while the DU is transmitting and the MT transmitting while the DU is receiving.

Embodiments herein describe aspects to efficiently support simultaneous operation (transmission or reception) by an IAB node's child/parent links. The embodiments may take into account timing modes (for example, duplex operation) of an IAB node and related downlink/uplink power control, crosslink interference (CLI), and interference measurements of backhaul links.

Aspects of operation of the network 100 that may be considered are whether existing uplink power control mechanisms, including packet headroom report (PHR), are sufficient to support operation of an IAB node operating in enhanced multiplexing modes. If existing mechanisms are not sufficient, aspects of consideration could include supporting and IAB node indicating information to assist with its uplink power control.

Further aspects of operation of the network 100 that may be considered are support of an IAB node indicating information to assist with downlink power control of its parent node toward the IAB node without mandating an expected behavior at the parent IAB node. Assistance information for supporting simultaneous operation within an IAB node may be used to avoid power imbalance. Further consideration may be given to: type of assistance information (for example, desired received power, power adjustment, preferred channel state information-reference signal (CSI-RS) resource, etc.); whether this information is provided to the parent node, the CU, or both; applicability of the assistance information (for example, relation to beams or multiplexing modes); and channel carrying this assistance information.

Embodiments of the present disclosure describe aspects related to IAB-MT reporting power headroom and related operations.

In a typical radio access network, a UE may use a PHR procedure to provide a gNB with information about a difference between a nominal UE maximum transmit power and an estimated power for an uplink shared channel (UL-SCH) or sounding reference signal (SRS) transmission per activated serving cell. The UE may also use PHR to provide information about a difference between the nominal UE maximum power and an estimated power for UL-SCH and PUCCH transmission on SpCell and PUCCH SCell.

A PHR may be triggered in such networks if: a phr-PeriodicTimer expires; or phr-ProhibitTimer expires or has expired and a pathloss has changed more than a threshold (phr-Tx-PowerFactorChange) decibels (dB) for at least one activated serving cell of any MAC entity that is used as a pathloss reference since the last transmission of a PHR in the MAC entity when the MAC entity has UL resources for new transmission.

Embodiments of the present disclosure describe PHR for an IAB MT in different duplex modes. For example, some embodiments describe PHR for TDM modes and simultaneous transmit modes.

A PHR procedure may be used to provide the DU 132 of the IAB parent 112 with a power headroom with respect to the MT 144 of IAB node 116. The PHR may be a Type 1 PHR or a Type 3 PHR. A Type 1 PHR may report a difference between a nominal MT maximum transmit power and an estimated power for an UL-SCH transmission per activated serving cell. A Type 3 PHR may report a difference between a nominal MT maximum transmit power and an estimated power for an SRS transmission per activated serving cell.

Unless otherwise described herein, the PHR procedure used by MT 136 may be similar to a PHR procedure used by a UE based on, for example, section 5.4.6 of 3GPP Technical Specification (TS) 38.321 v16.3.0 (2020-12).

Figure 2:
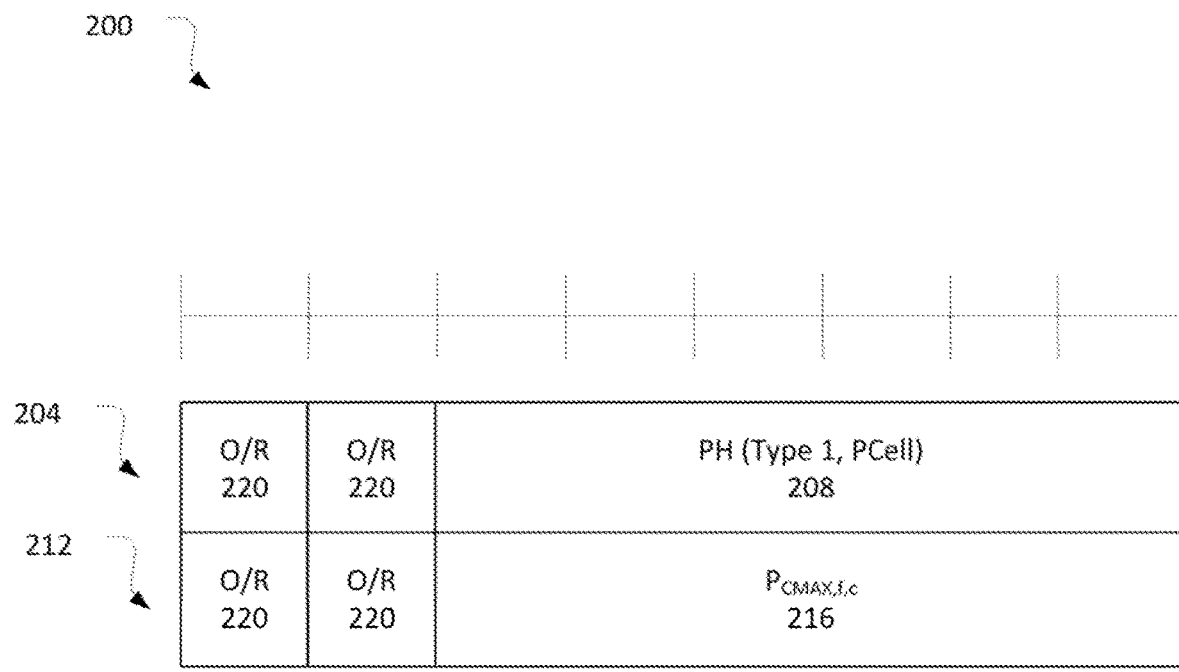
FIG. 2 illustrates a packet headroom report in accordance with some embodiments.

FIG. 2 illustrates a PHR 200 in accordance with some embodiments. The PHR 200 may be transmitted from the MT 144 of IAB node 116 to the DU 132 of the IAB parent 112. The PHR 200 may be a single entry MAC control element (CE) having two octets. A first octet 204 may include a PH field 208 that occupies six bits. The PH field 208 may provide an indication of a power headroom level 0-63. Each power headroom level may correspond to a measured quantity value as indicated in Table 1 below, for example. Table 1 corresponds to Table 10.1.17.1-1 of 3GPP TS 38.133 v17.0.0 (2020-12). In other embodiments, the power headroom levels may correspond to other measured quantity values.

TABLE 1

| Reported value | Measured quantity value (dB) |
| --- | --- |
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| . . . | . . . |
| POWER_HEADROOM_53 | 20 ≤ PH < 21 |
| POWER_HEADROOM_54 | 21 ≤ PH < 22 |
| POWER_HEADROOM_55 | 22 ≤ PH < 24 |
| POWER_HEADROOM_56 | 24 ≤ PH < 26 |
| POWER_HEADROOM_57 | 26 ≤ PH < 28 |
| POWER_HEADROOM_58 | 28 ≤ PH < 30 |
| POWER_HEADROOM_59 | 30 ≤ PH < 32 |
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

The PH field 208 indicates that it is a Type 1 PHR provided for a primary serving cell (PCell). However, other types and serving cells may be used in other embodiments.

A second octet 212 may include a P_CMAX,f,c field 216 that occupies six bits. The P_CMAX,f,c field 216 indicates a reported value of 0-63 for an MT configured maximum output power that was used to calculate the power headroom level reported in PH field 208. This may allow the DU 132 to calculate a pathloss. The reported value may correspond to a measured quantity value based on Table 2 below, for example. Table 2 corresponds to table 10.1.18.1-1 of 3GPP TS 38.133.

TABLE 2

| Reported value | Measured quantity value | Unit |
| --- | --- | --- |
| PCMAX_C_00 | $P_{CMAXc,f} < -29$ | dBm |
| PCMAX_C_01 | $-29 \leq P_{CMAXc,f} < -28$ | dBm |
| PCMAX_C_02 | $-28 \leq P_{CMAXc,f} < -27$ | dBm |
| . . . | . . . | |
| PCMAX_C_61 | $31 \leq P_{CMAXc,f} < 32$ | dBm |
| PCMAX_C_62 | $32 \leq P_{CMAXc,f} < 33$ | dBm |
| PCMAX_C_63 | $33 \leq P_{CMAXc,f}$ | dBm |

In some embodiments, the power headroom level reported by the PH field 208 may correspond to a first duplex mode, for example, TDM multiplexing. That is, the reported power headroom level may be used in the event that the MT 144 is transmitting and the DU 140 is neither transmitting nor receiving.

In addition to the power headroom level reported by the PH field 208, the PHR 200 may include an offset field to indicate/report an offset to the reported power headroom level for the case of a second duplex mode. The second duplex mode may be a simultaneous transmit mode in which the MT 144 is transmitting while the DU 140 is either receiving (for example, from the UE 104 or IAB child 120) or transmitting (for example, to the UE 104 or the IAB child 120).

The offset field may include one or more of the offset/reserved (O/R) fields 220. The offset field may provide up to four bits that may indicate offset levels 0-15. The offset levels may correspond to offsets as shown by Table 3 below for example. In other embodiments, the offset levels may be mapped to other offsets. Additionally/alternatively, the offsets may be semi-statically configured by gNB-CU and/or semi-statically coordinated between IAB-node and IAB-parent.

TABLE 3

| Reported value | Offset (dB) |
| --- | --- |
| OFFSET_0 | 0 |
| OFFSET_1 | 0.1 |
| OFFSET_2 | 0.5 |
| ... | ... |
| OFFSET_15 | 5 |

The offsets of Table 3 are negative offsets, as the uplink power used for simultaneous transmit mode will be less than the uplink power used for TDM mode.

The reported offset may provide the DU 132 with an indication of a power headroom for the second duplex mode with reference to the power headroom for the first duplex mode. For example, if the power headroom for the first duplex mode is −30 dB and OFFSET_1 is provided in the PHR 200, the power headroom for the second duplex mode may be −30.1 dB.

In some embodiments, the offset levels may correspond to the power headroom levels instead of offset power values. For example, the offset levels may correspond to PH-level offsets as shown by Table 4 below for example. In other embodiments, the offset levels may be mapped to other PH-level offsets.

TABLE 4

| Reported value | Offset (PH level) |
| --- | --- |
| OFFSET_0 | 0 |
| OFFSET_1 | 1 |
| ... | ... |
| OFFSET_15 | 15 |

For example, if the power headroom level reported for the first duplex mode is POWER_HEADROOM_53 and OFFSET_1 is provided in the PHR 200, the power headroom for the second duplex mode may correspond to POWER_HEADROOM_52.

While the above embodiment describes the PH field 208 indicating a power headroom for the TDM duplex mode, other embodiments may use the PH field 208 to indicate a power headroom for the simultaneous transmit mode. In these embodiments, the offset field may be used to provide the power headroom for the TDM duplex mode based on the power headroom for the simultaneous transmit mode. This may be done similar to that described above; except replacing the negative offsets with positive offsets.

In some embodiments, instead of actively signaling an offset in the PHR 200, the DU 132 may be semi-statically configured with an offset. For example, the CU 124 may configure the DU 132 with an offset that is to be used for the MT 144. This may be done through an F1 interface between the IAB donor 108 and the IAB parent 112.

In some embodiments, power headroom values for a duplex mode in which the MT and the DU are simultaneously transmitting, which may be referred to as a simultaneous MT-Tx/DU-Tx mode, may be different from power headroom values for a duplex mode in which the MT is transmitting while the DU, which may be referred to simultaneous MT-Tx/DU-Rx mode. The different power headroom values for the different simultaneous transmit modes may be due to the interference of concern being located at different entities. For example, when the DU is transmitting, the interference of concern may be at a remote UE or MT. However, when the DU is receiving, the interference of concern may be at the receiving DU. Thus, the transmit power of the MT may be backed off to a larger degree for MU-Tx/DU-Rx than for MU-Tx/DU-Tx.

To accommodate the different power headroom values for the different simultaneous transmit modes, some embodiments may use the O/R fields of the PHR 200 to indicate separate offsets for the different simultaneous transmit modes. For example, the O/R fields may indicate a first offset for a simultaneous MT-Tx/DU-Tx mode and a second offset for a simultaneous MT-Tx/DU-Rx mode. The two offsets may be indicated by either of the following options.

In a first option, a single codepoint of the reserved bits may be mapped to the offsets for simultaneous MT-Tx/DU-Tx mode and simultaneous MT-Tx/DU-Rx mode. The offsets may be the same or different. For example, the offset field may provide up to four bits that may indicate offset levels 0-15. The offset levels may correspond to offsets as shown by Table 5 below for example. In other embodiments, the offset levels may be mapped to other offsets.

TABLE 5

| Reported value | Offset 1 (dB) | Offset 2 (dB) |
| --- | --- | --- |
| OFFSET_0 | 0.1 | 0.5 |
| OFFSET_1 | 0.2 | 0.6 |
| ... | ... | ... |
| OFFSET_15 | 1.5 | 1.9 |

Thus, a bit value of '0000' may indicate a 0.1 dB offset (relative to a reported TDM mode power headroom level) for a first duplex mode (for example, simultaneous MT-Tx/DU-Tx) and a 0.5 dB offset (relative to a reported TDM power headroom level) for a second duplex mode (for example, simultaneous MT-Tx/DU-Rx).

In a second option, the O/R field may be divided into two offset fields that provide independent codepoints. For example, the O/R fields 220 of the first octet 204 may be used as a first offset field to indicate an offset for simultaneous MT-Tx/DU-Tx mode, while the O/R fields 220 of the second octet 212 may be used as a second offset field to indicate an offset for simultaneous MT-Tx/DU-Rx mode.

Reporting of the independent offsets for simultaneous transmit modes may be modified as described above for transmitting one offset. For example, a power headroom level may be reported for a first simultaneous transmit mode and offsets may be reported for the second simultaneous transmit mode and the TDM mode; the offsets may be reported with respect to PH levels instead of offset power values; etc.

FIG. 3 illustrates a PHR 300 in accordance with some embodiments. The PHR 300 may be transmitted from the MT 144 of IAB node 116 to the DU 132 of the IAB parent 112. The PHR 300 may be a multiple entry MAC CE having a variable number of octets. Typically, a multiple entry MAC CE may include a number of PH fields and configured maximum power output fields for different cells and MAC entities. In this embodiment, the PHR 300 may include a number of octet pairs, with each pair corresponding to one type and one duplex mode (DM).

A first octet pair 304 may include a PH field that provides a Type 1 power headroom level for the PCell operating in a first duplex mode (DM1). One or more of the bits in the reserved fields of the second octet of the first octet pair 304 may be used as a duplex mode indicator to indicate the duplex mode to which the power headroom level corresponds. For example, in one embodiment a two-bit value of '00' may indicate the power headroom level corresponds to DM1, which may be a TDM mode in some embodiments.

A second octet pair 308 may include a PH field that provides a Type 3 power headroom level for the PCell operating in the first duplex mode (DM1). One or more of the reserved fields of the second octet of the second octet pair 308 may be used as a duplex mode indicator to indicate the duplex mode to which the power headroom level corresponds, for example, DM1.

A third octet pair 312 may include PH field that provides a Type 1 power headroom level for the PCell operating in a second duplex mode (DM2). One or more of the reserved fields of the second octet of the third octet pair 312 may be used as a duplex mode indicator to indicate the duplex mode to which the power headroom level corresponds. For example, in one embodiment a two bit value of '01' may indicate the power headroom level corresponds to DM2, which may be a simultaneous MT-Tx/DU-Tx mode in some embodiments.

A fourth octet pair 316 may include a PH field that provides a Type 3 power headroom level for the PCell operating in the second duplex mode (DM2). One or more of the reserved fields of the second octet of the fourth octet pair 316 may be used as a duplex mode indicator to indicate the duplex mode to which the power headroom level corresponds, for example, DM2.

A fifth octet pair 320 may include a PH field that provides a Type 1 power headroom level for the PCell operating in a third duplex mode (DM3). One or more of the reserved fields of the second octet of the fifth octet pair 320 may be used as a duplex mode indicator to indicate the duplex mode to which the power headroom level corresponds. For example, in one embodiment a two bit value of '11' may indicate the power headroom level corresponds to DM3, which may be a simultaneous MT-Tx/DU-Rx mode in some embodiments.

A sixth octet pair 324 may include a PH field that provides a Type 3 power headroom level for the PCell operating in the third duplex mode (DM3). One or more of the reserved fields of the second octet of the sixth octet pair 324 may be used as a duplex mode indicator to indicate the duplex mode to which the power headroom level corresponds, for example, DM3.

In other embodiments, additional or fewer octet pairs may be used in a multiple entry MAC CE. For example, in some embodiments only one power headroom level may be indicated for both simultaneous transmit modes. In other embodiments, the PHR 300 may include only one type for each duplex mode. For example, the PHR 300 may indicate: Type 1 power headroom levels for TDM and simultaneous transmit modes; a Type 1 power headroom level for TDM mode and a Type 3 power headroom level for simultaneous transmit modes; a Type 3 power headroom level for TDM mode and a Type one power headroom level for the simultaneous transmit modes; or some other combination.

In some embodiments, the reserved bit fields of the octets of the PHR 300 may be used to indicate an offset similar to that described above with respect to FIG. 2.

In some embodiments, the MT 144 may generate and transmit a PHR, such as PHR 200 or PHR 300, based on a detected trigger event. The detected trigger event may be similar to those used to trigger PHRs in previous networks such as those described above, for example. Additionally/alternatively, the detected trigger events may include a change of duplex mode within the IAB node 116. For example, a detected trigger event may occur if the IAB node 116 changes: from a TDM mode to a simultaneous MT-Tx/DU-Tx mode or vice versa; from a TDM mode to a simultaneous MT-Tx/DU-Rx mode or vice versa; or from a simultaneous MT-Tx/DU-Tx mode to a simultaneous MT-Tx/DU-Rx mode or vice versa.

Figure 4:
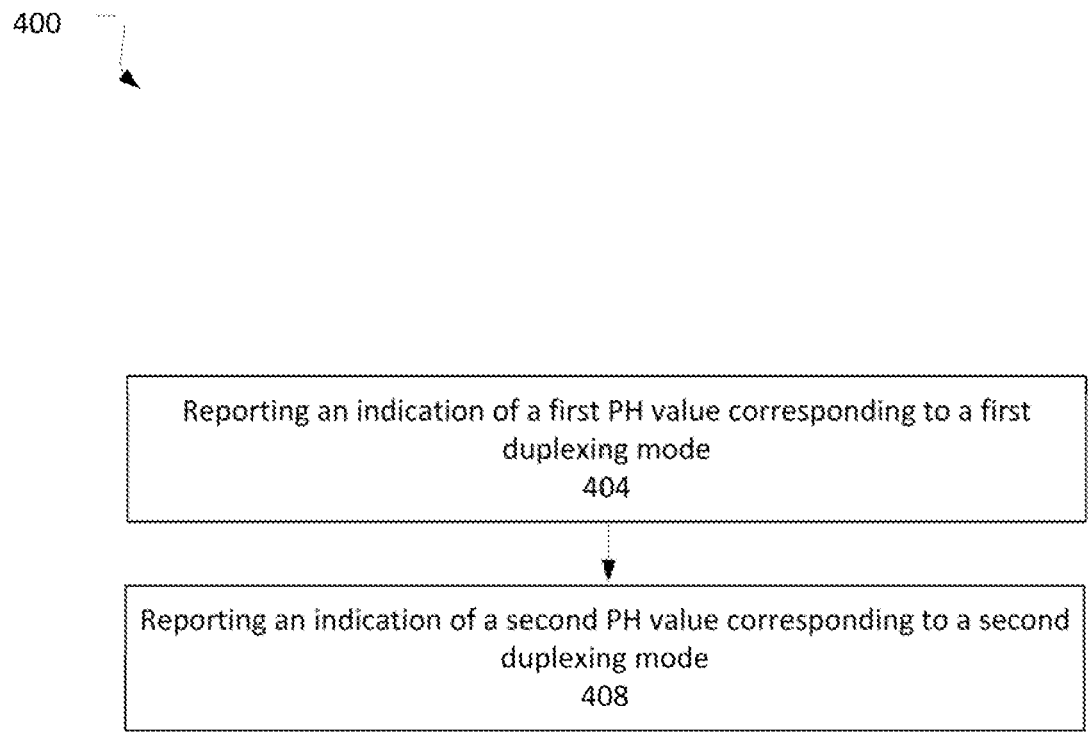
FIG. 4 illustrates an operational flow/algorithmic structure in accordance with some embodiments.

FIG. 4 illustrates an operation flow/algorithmic structure 400 in accordance with some embodiments. The operation flow/algorithmic structure 400 may be performed or implemented by an IAB node such as, for example, IAB node 116 or 700; or components thereof, for example, MT 144 or baseband processor 704A.

The operation flow/algorithmic structure 400 may include, at 404, reporting an indication of a first PH value corresponding to a first duplex mode of the IAB node. The first duplex mode may be mode in which an MT of the IAB node is transmitting and a DU of the IAB node is neither transmitting or receiving. For example, the first duplex mode may be a TDM mode.

The operation flow/algorithmic structure 400 may further include, at 408, reporting an indication of a second PH value corresponding to a second duplexing mode. The second duplex mode may be a mode in which the MT of the IAB node is transmitting while the DU of the IAB node is either transmitting or receiving. For example, the second duplex mode may be a simultaneous transmit mode.

In some embodiments, the first and second indications may be part of a PHR. The PHR may be a single entry MAC CE or a multiple entry MAC CE. In some embodiments, the first indication may be a six-bit indication that corresponds to a power headroom level that may be mapped to the first PH value based on a predefined lookup table. The predefined lookup table may be stored in a memory of the IAB node. The predefined lookup table may be configured by a 3GPP TS or may be dynamically configured during operation. The second indication may be one- to four-bit offset indication that defines the second PH value relative to the first PH value. In other embodiments, the second indication may be the six-bit indication and the first indication may be the one- to four-bit offset indication.

Figure 5:
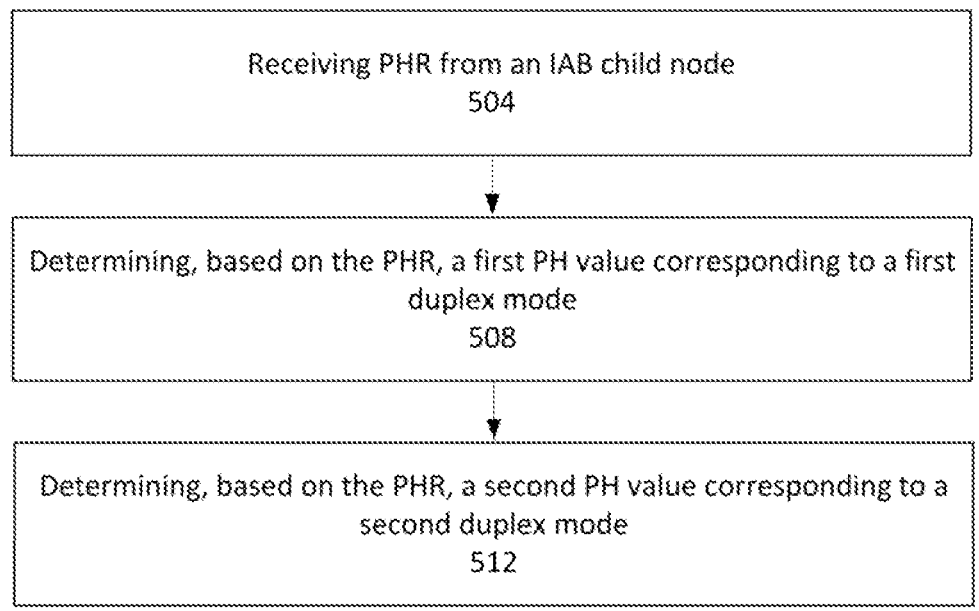
FIG. 5 illustrates another operational flow/algorithmic structure in accordance with some embodiments.

FIG. 5 illustrates an operation flow/algorithmic structure 500 in accordance with some embodiments. The operation flow/algorithmic structure 500 may be performed or implemented by an IAB parent node such as, for example, IAB parent 112; or components thereof, for example, DU 132 or baseband processor 704A.

The operation flow/algorithmic structure 500 may include, at 504, receiving a PHR from an IAB child node. The PHR may be a single-entry MAC CE such as that shown above with respect to PHR 200, or a multi-entry MAC CE such as that shown above with respect to PHR 300.

The operation flow/algorithmic structure 500 may further include, at 508, determining, based on the PHR, a first PH value corresponding to a first duplex mode. The first duplex mode in this instance may be a TDM mode, a generic simultaneous transmit mode, a simultaneous MT-Tx/DU-Rx mode, or a simultaneous MT-Tx/DU-Tx mode. In some embodiments, the IAB parent may determine the first PHR value by detecting a power headroom level from a six-bit indication in the PHR and mapping the reported power headroom level to the first PHR value using a predefined lookup table.

The operation flow/algorithmic structure 500 may further include, at 512, determining, based on the PHR, a second PH value corresponding to a second duplex mode. The second duplex mode in this instance may be different from the first duplex mode and may be a TDM mode, a generic simultaneous transmit mode, a simultaneous MT-Tx/DU-Rx mode, or a simultaneous MT-Tx/DU-Tx mode. In some embodiments, the IAB parent may determine the second PHR value by detecting a power headroom level from a six-bit indication in the PHR and mapping the reported power headroom level to the second PHR value using the predefined lookup table; or detecting an indication of an offset value, and determining the second PHR value relative to the first PHR value. The indication of the offset value may be provided in the PHR itself or semi-statically configured by a CU of an IAB donor.

Figure 6:
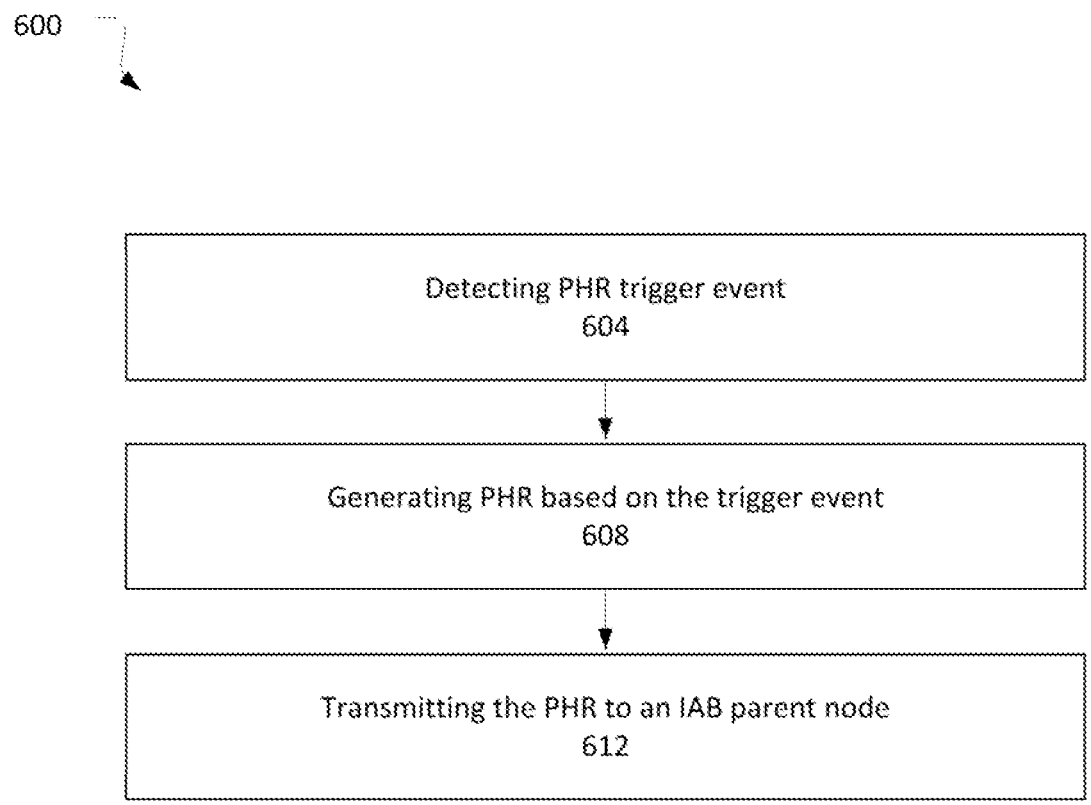
FIG. 6 illustrates another operational flow/algorithmic structure in accordance with some embodiments.

FIG. 6 illustrates an operation flow/algorithmic structure 600 in accordance with some embodiments. The operation flow/algorithmic structure 500 may be performed or implemented by an IAB node such as, for example, IAB node 116; or components thereof, for example, MT 144 or baseband processor 704A.

The operation flow/algorithmic structure 600 may include, at 604, detecting a PHR trigger event. The PHR trigger event may be a change in a duplex mode of the IAB node. For example, the change may be: from a TDM mode to a simultaneous MT-Tx/DU-Tx mode or vice versa; from a TDM mode to a simultaneous MT-Tx/DU-Rx mode or vice versa; or from a simultaneous MT-Tx/DU-Tx mode to a simultaneous MT-Tx/DU-Rx mode or vice versa.

The operation flow/algorithmic structure 600 may further include, at 608, generating a PHR based on the trigger event. The PHR may be similar to that described above with respect to FIG. 2 or FIG. 3.

The operation flow/algorithmic structure 600 may further include, at 612, transmitting the PHR to an IAB parent node.

Figure 7:
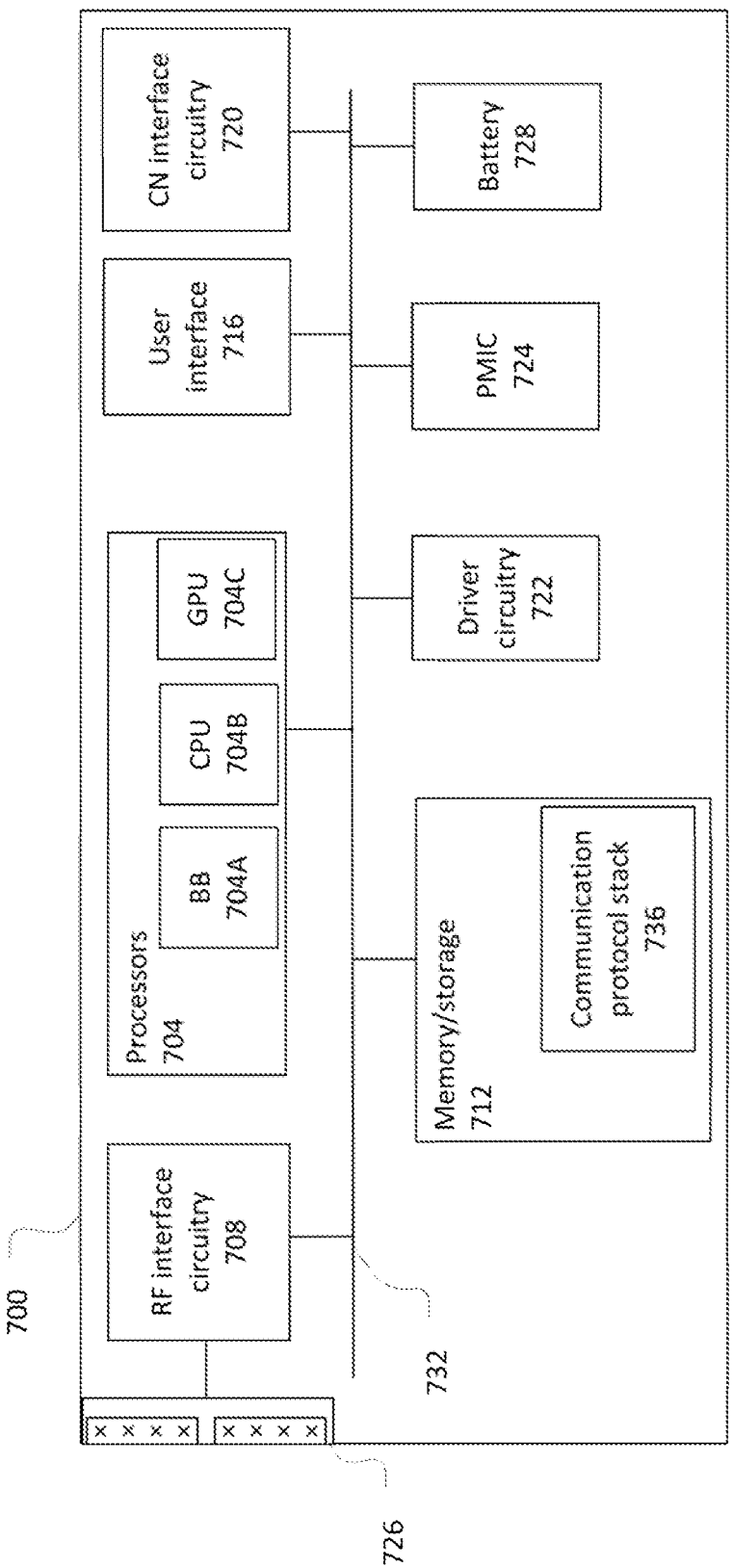
FIG. 7 illustrates an IAB node in accordance with some embodiments.

FIG. 7 illustrates an IAB node 700 in accordance with some embodiments. The IAB node 700 may be similar to and substantially interchangeable with IAB donor 108, IAB parent 112, IAB node 116, or IAB child 120 as shown in FIG. 1.

The IAB node 700 may include processors 704, RF interface circuitry 708, memory/storage 712, user interface 716, core network (CN) interface 720, driver circuitry 722, power management integrated circuit (PMIC) 724, antenna structure 726, and battery 728. The components of the IAB node 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the IAB node 700. However, some of the components shown may be omitted, additional components may be present, and different arrangement of the components shown may occur in other implementations.

The components of the IAB node 700 may be coupled with various other components over one or more interconnects 732, which may represent any type of interface, input/output, bus (local, system, or expansion), transmission line, trace, optical connection, etc. that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the IAB node 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 712 may include one or more non-transitory, computer-readable media that includes instructions (for example, communication protocol stack 736) that may be executed by one or more of the processors 704 to cause the IAB node 700 to perform various operations described herein. Further, the memory/storage 712 may be used to store IAB and power headroom configuration information including, for example, lookup tables, configured offsets, etc.

The memory/storage 712 include any type of volatile or non-volatile memory that may be distributed throughout the IAB node 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 708 may include transceiver circuitry and radio frequency front module (RFEM) that allows the IAB node 700 to communicate with other devices over a radio access network. The RF interface circuitry 708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 726.

In various embodiments, the RF interface circuitry 708 may be configured to transmit/receive signals in a manner compatible with NR access technologies and IAB technologies.

The antenna 726 may include antenna elements to convert electrical signals into radio waves to travel through the air and to convert received radio waves into electrical signals. The antenna elements may be arranged into one or more antenna panels. The antenna 726 may have antenna panels that are omnidirectional, directional, or a combination thereof to enable beamforming and multiple input, multiple output communications. The antenna 726 may include microstrip antennas, printed antennas fabricated on the surface of one or more printed circuit boards, patch antennas, phased array antennas, etc. The antenna 726 may have one or more panels designed for specific frequency bands including bands in FR1 or FR2.

The user interface circuitry 716 includes various input/output (I/O) devices designed to enable user interaction with the IAB node 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The CN interface circuitry 720 may provide connectivity to a core network, for example, a 5GC, using a 5GC-compatible network interface protocol such as carrier Ethernet protocols, or some other suitable protocol. Network connectivity may be provided to/from the IAB node 1700 via a fiber optic or wireless backhaul. The CN interface circuitry 720 may include one or more dedicated processors or FPGAs to communicate using one or more of the aforementioned protocols. In some implementations, the CN interface circuitry 720 may include multiple controllers to provide connectivity to other networks using the same or different protocols.

The driver circuitry 722 may include software and hardware elements that operate to control particular devices that are embedded in the IAB node 700, attached to the IAB node 700, or otherwise communicatively coupled with the IAB node 700. The driver circuitry 722 may include individual drivers allowing other components to interact with or control various input/output (I/O) devices that may be present within, or connected to, the IAB node 700. For example, driver circuitry 722 may include a display driver to control and allow access to a display device, a touchscreen driver to control and allow access to a touchscreen interface, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the IAB node 700. In particular, with respect to the processors 704, the PMIC 724 may control power-source selection, voltage scaling, battery charging, or DC-to-DC conversion.

A battery 728 may power the IAB node 700, although in some examples the IAB node 700 may be mounted deployed in a fixed location, and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes method of operating a mobile termination (MT) of an integrated access and backhaul (IAB) node, the method comprising: reporting, to a distributed unit (DU) of an IAB parent node, an indication of a first power headroom (PH) value corresponding to a first duplex mode of the IAB node in which the MT is transmitting and a DU of the IAB node is neither transmitting nor receiving; and reporting, to the DU of the IAB parent node, an indication of a second PH value corresponding to a second duplexing mode of the IAB node in which the MT is transmitting and the DU of the IAB node is transmitting or receiving.

Example 2 includes the method of example 1 or some other example herein, wherein reporting the indication of the second PH value comprises: generating a media access control (MAC) (CE) with the indication of the second PH value being an indication of an offset from the first PH value.

Example 3 includes the method of example 2 or some other example herein, wherein the MAC CE includes six bits to provide the indication of the first PH value and two or four bits to provide the indication of the offset.

Example 4 includes the method of example 1 or some other example herein, wherein reporting the indication of the first PH value and reporting the indication of the second PH value comprises: generating a media access control (MAC) (CE) with the indication of the first PH value being an indication of an offset from the second PH value.

Example 5 includes the method of example 4 or some other example herein, wherein the MAC CE includes six bits to provide the indication of the second PH value and two or four bits to provide the indication of the offset.

Example 6 includes the method of example 1 or some other example herein, further comprising: detecting a change in a duplex mode of the IAB node; and reporting the indication of the first PH value or the indication of the second PH value based on said detecting of the change in the duplex mode.

Example 7 includes the method of example 6 or some other example herein, wherein the change is a change from a time-division multiplex (TDM) mode to a simultaneous transmit mode; from a simultaneous transmit mode to a TDM mode; or from a first simultaneous transmit mode to a second simultaneous transmit mode.

Example 8 includes a method of operating a distributed unit (DU) of an integrated access and backhaul (IAB) parent node, the method comprising: receiving a power headroom report (PHR) from an IAB child node; determining, based on the PHR, a first power headroom (PH) value corresponding to a first duplex mode in which a mobile terminal (MT) of the IAB child node is transmitting and a DU of the IAB child node is neither transmitting nor receiving; and determining, based on the PHR, a second PH value corresponding to a second duplex mode in which the MT is transmitting and the DU of the IAB child node is either transmitting or receiving.

Example 9 includes the method of example 8 or some other example herein, wherein the PHR includes an indication of the first PH value or the second PH value.

Examples 10 includes the method of example 9 or some other example herein, wherein the method further comprises: receiving, from a next generation node B (gNB)-centralized unit (CU), an indication of an offset; determining the first PH value or the second PH value based on the indication of the offset and the indication in the PHR.

Example 11 includes the method of operating a mobile terminal (MT) of an integrated access and backhaul (IAB) node, the method comprising: generating a power headroom report (PHR) to include an indication of a first power headroom (PH) value, an indication of a second PH value, and a duplex mode indicator corresponding to the first PH value, wherein the duplex mode indicator is to indicate whether the first PH value corresponds to a time-division multiplexing (TDM) mode of the IAB node or a simultaneous transmit mode of the IAB node; and transmitting the PHR to an IAB parent node.

Example 12 includes the method of example 11 or some other example herein, wherein the duplex mode indicator is to indicate that the first PH value corresponds to the simultaneous transmit mode, wherein the simultaneous transmit mode includes the MT transmitting while a distributed (DU) of the IAB node is either transmitting or receiving.

Example 13 includes the method of example 11 or some other example herein, wherein the duplex mode indicator is a first duplex mode indicator and the method further comprises: generating the PHR to include a second duplex mode indicator to indicate whether the second PH value corresponds to the TDM mode or the simultaneous transmit mode of the IAB node.

Example 14 includes the method of example 11 or some other example herein, wherein the duplex mode indicator comprises one or two bits and the indication of the first PH value comprises six bits.

Example 15 includes the method of any one of examples 11-14 or some other example herein, wherein the PHR is a multiple entry media access control (MAC) control element (CE).

Example 16 includes a method of operating a mobile termination (MT) of an integrated access and backhaul (IAB) node, the method comprising: reporting, to a distributed unit (DU) of an IAB parent node, an indication of a first power headroom (PH) value corresponding to a first duplex mode in which the MT is transmitting and a DU of the IAB node is not transmitting or receiving; and reporting, to the DU of the IAB parent node, an indication of a second PH value corresponding to a second duplex mode in which the MT is transmitting and the DU of the IAB node is transmitting; and reporting, to the DU of the IAB parent node, an indication of a third PH value corresponding to a third duplex mode in which the MT is transmitting and the DU of the IAB node is receiving.

Example 17 includes the method of example 16 or some other example herein, further comprising: generating a power headroom report (PHR) to include: an indication of a first offset to report the indication of the second PH value; and an indication of the second offset to report the indication of the third PH value.

Example 18 includes the method of example 17 or some other example herein, further comprising: setting a plurality of bits of an offset field in the PHR to a single codepoint that corresponds to the first and second offsets in a lookup table.

Example 19 includes the method of example 17 or some other example herein, further comprising: setting one or more bits of a first offset field in the PHR to a first codepoint that corresponds to the first offset in a lookup table; and setting one or more bits of a second offset field in the PHR to a second codepoint that corresponds to the second offset in the lookup table.

Example 20 includes the method of any one of examples 17-19 or some other example herein, wherein the PHR report comprises a single entry media access control (MAC) control element (CE) or a multiple entry MAC CE.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processor circuitry to:
generate a media access control (MAC) control element (CE) that includes: an indication of a power value associated with control of an uplink transmit power of a mobile termination (MT) of an integrated access and backhaul (IAB) node; and a mode indicator to indicate that the power value corresponds to a mode of the IAB node in which the MT is transmitting and a distributed unit of the IAB node is transmitting or receiving; and
output the MAC CE for transmission to a DU of an IAB parent node.

2. The one or more non-transitory, computer-readable media of claim 1, wherein power value is relative to a maximum transmit power.

3. The one or more non-transitory, computer-readable media of claim 2, wherein the MAC CE further includes an indication of the maximum transmit power.

4. The one or more non-transitory, computer-readable media of claim 1, the mode indicator comprises two bits of the MAC CE.

5. The one or more non-transitory, computer-readable media of claim 1, wherein the mode of the IAB node comprises the MT transmitting and the DU of the IAB node transmitting.

6. The one or more non-transitory, computer-readable media of claim 1, wherein the mode of the IAB node comprises the MT transmitting and the DU of the IAB node receiving.

7. The one or more non-transitory, computer-readable media of claim 1, wherein the MAC CE further includes an indication of applicability of the power value to a beam.

8. An apparatus comprising:
interface circuitry; and
processing circuitry, coupled to the interface circuitry, to:
receive, via the interface circuitry, a transmission having a media access control (MAC) control element (CE) that includes: an indication of a power value associated with control of an uplink transmit power of a mobile termination (MT) of an integrated access and backhaul (IAB) node; and a mode indicator to indicate that the power value corresponds to a mode in which the MT is transmitting and a distributed unit (DU) of the IAB node is transmitting or receiving; and
control the uplink transmit power of the MT based on the power value.

9. The apparatus of claim 8, wherein the power value is relative to a maximum transmit power.

10. The apparatus of claim 9, wherein the MAC CE further includes an indication of the maximum transmit power.

11. A method comprising:
generating a media access control (MAC) control element (CE) that includes: an indication of a power value associated with control of an uplink transmit power of a mobile termination (MT) of an integrated access and backhaul (IAB) node; and mode indicator to indicate that the power value corresponds to a mode of the IAB node in which the MT is transmitting and a distributed unit (DU) of the IAB node is transmitting or receiving; and
outputting the MAC CE for transmission to an IAB parent node.

12. The method of claim 11, wherein the power value is relative to a maximum transmit power.

13. The method of claim 12, wherein the MAC CE further includes an indication of the maximum transmit power.

14. The method of claim 11, wherein the mode indicator comprises two bits of the MAC CE.

15. The method of claim 11, wherein the mode of the IAB node comprises the MT transmitting and the DU of the IAB node transmitting.

16. The method of claim 11, wherein the mode of the IAB node comprises the MT transmitting and the DU of the IAB node receiving.

17. The apparatus of claim 8, wherein the mode indicator comprises two bits of the MAC CE.

18. The apparatus of claim 8, wherein the mode of the IAB node comprises the MT transmitting and the DU of the IAB node transmitting.

19. The apparatus of claim 8, wherein the mode of the IAB node comprises the MT transmitting and the DU of the IAB node receiving.

20. The apparatus of claim 8, wherein the MAC CE further includes an indication of applicability of the power value to a beam.

\* \* \* \* \*